United States Patent
Miller et al.

(10) Patent No.: US 7,131,572 B2
(45) Date of Patent: Nov. 7, 2006

(54) AUTOMATIC BUSINESS REPLY MAIL FUNDING

(75) Inventors: Kenneth G. Miller, Bethel, CT (US); John H. Winkelman, Southbury, CT (US); Suzanne Konstance, Old Greenwich, CT (US); Cornelius S. McNab, Cambridge, MA (US)

(73) Assignee: Pitney Bowes Inc., Stamford, CT (US)

( * ) Notice: Subject to any disclaimer, the term of this patent is extended or adjusted under 35 U.S.C. 154(b) by 16 days.

(21) Appl. No.: 10/890,850

(22) Filed: Jul. 14, 2004

(65) Prior Publication Data
US 2005/0011943 A1 Jan. 20, 2005

Related U.S. Application Data

(60) Provisional application No. 60/488,230, filed on Jul. 17, 2003.

(51) Int. Cl.
G06F 17/00 (2006.01)

(52) U.S. Cl. .......................... 235/375; 705/402
(58) Field of Classification Search ................ 235/378, 235/462.01, 462.02, 375, 381, 383, 462.08; 705/401, 402; 209/584, 900
See application file for complete search history.

(56) References Cited

U.S. PATENT DOCUMENTS

| | | | |
|---|---|---|---|
| 6,061,082 A * | 5/2000 | Park .......................... 725/14 |
| 6,510,992 B1 | 1/2003 | Wells et al. ................. 235/385 |
| 6,526,393 B1 * | 2/2003 | Fredman ..................... 705/408 |
| 6,557,755 B1 | 5/2003 | Pickering et al. ........... 235/376 |
| 2003/0101148 A1 * | 5/2003 | Montgomery et al. ...... 705/404 |
| 2003/0132854 A1 * | 7/2003 | Swan et al. ............ 340/825.49 |
| 2004/0004119 A1 * | 1/2004 | Baldassari et al. .......... 235/384 |
| 2004/0083189 A1 * | 4/2004 | Leon .......................... 705/401 |

\* cited by examiner

Primary Examiner—Ahshik Kim
Assistant Examiner—Kumiko C. Koyama
(74) Attorney, Agent, or Firm—Ronald Reichman; Angelo N. Chaclas

(57) ABSTRACT

A method for enabling a mailer to infer the amount of business reply that he/she is going to receive on a given day and determine the amount of postage that is due. The foregoing is accomplished by placing a planet code that references the mailer's permit number on the business reply so that when a scanner at the USPS reads the planet code, the postage for the business reply will be calculated, and the mailer will be notified of the calculation so that the mailer may deposit sufficient funds in a deposit account to pay for the postage. The mailer may deposit funds in the account by issuing a check, having funds automatically transferred from some account, or automatically having a check issued so that someone may take the check to the USPS and receive the business reply. Thus, the mailer will be able to determine the amount of postage that is going to be charged to his/her account.

8 Claims, 4 Drawing Sheets

AUTOMATIC BUSINESS REPLY MAIL FUNDING

This Application claims the benefit of the filing date of U.S. Provisional Application No. 60/488,230 filed Jul. 17, 2003, which is owned by the assignee of the present Application.

FIELD OF THE INVENTION

The invention relates generally to the field of mailing systems and, more particularly, to postage payment systems.

BACKGROUND OF THE INVENTION

Business mailers prepare and process various types of business mail utilizing inserters to collate the sheets and stuff the same into envelopes. Invoices, advertisements for the purchase of goods and/or services, prepaid post cards as well as business reply mail pieces, i.e., business reply envelopes, business reply cards. Business reply mail pieces sometimes are placed in outer envelopes mailed by business mailers to customers. Recipients of business mailers' mail may enclose a check and invoice and/or an advertisement order form in the business reply mail piece and mail it via the United States Postal Service (USPS) to the business mailer. Business mailer recipient customers may also mail the enclosed business reply card back to the business mailer.

The USPS allows a business mailer to receive first class business reply business reply from their customers and pay postage and a fee only for the returned to the mailer from the original distribution of the mailing. Postage and fees are collected when the mailer picks up the business reply mail pieces at his/her local USPS office. The mailer is unaware of how many business reply mail pieces are going to be returned to him/her by his/her customers. For instance, if a mailer mailed one million envelopes containing advertisements with business reply envelopes, the mailer may owe the USPS $9,700.00 if 10,000 business reply mail pieces were returned to the business mailer. If 100,000 business reply mail pieces were delivered to the mailer by the USPS, the mailer would owe the USPS $97,000.00; and if 1,000,000 business reply mail pieces were delivered to the mailer by the USPS, the mailer would owe the USPS $970,000.00.

The USPS has established deposit accounts in which the mailer may deposit money to pay for the business replies that are delivered to the mailer's local USPS office. Since the mailer does not know on a daily basis how many business replies will be delivered to the mailer's local post office, the mailer does not know how much money to keep in his/her deposit account.

Thus, one of the disadvantages of the prior art is that mailers are unaware of the amount of money they are required to place in their deposit accounts on a daily basis; hence, the mailers over fund their deposit accounts, adversely affecting their cash flow.

SUMMARY OF THE INVENTION

The present invention overcomes the disadvantages of the prior art by enabling a mailer to infer the amount of business reply mail pieces that he/she will receive on a given day and determine the amount of postage that is due. This invention accomplishes the foregoing by placing a code, i.e., planet code, that references the mailer's permit number on the business reply mail pieces so that when a scanner at a carrier, i.e., USPS, reads the planet code, the postage for the business reply will be calculated, and the mailer will be notified of the calculation so that the mailer may deposit sufficient funds in a deposit account to pay for the postage. The mailer may deposit funds in the account by issuing a check, having funds automatically transferred from some account, or automatically having a check issued so that someone may take the check to the USPS and receive the business reply mail piece. Thus, the mailer will be able to determine the amount of postage that is going to be charged to his/her account.

DETAILED DESCRIPTION OF THE PREFERRED EMBODIMENT

Figure 1:
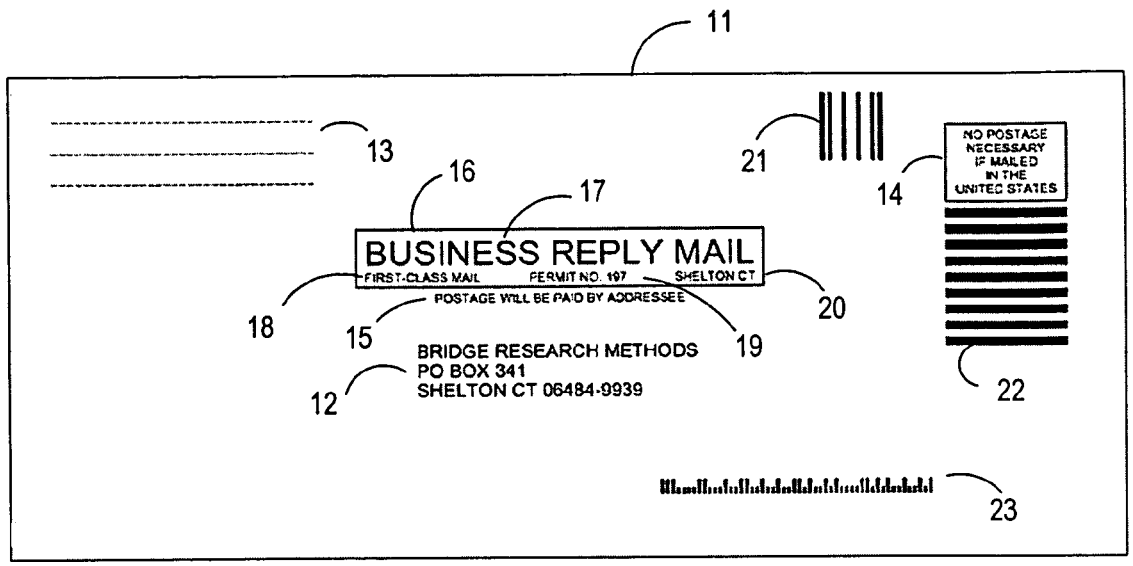
FIG. 1 is a drawing of a prior art business reply mail piece.

Referring now to the drawings in detail, and more particularly to Prior Art FIG. 1, the reference character 11 represents a business reply mail piece. Mail piece 11 has a recipient address field 12, and a sender address field 13, that is completed by the person returning business reply mail piece 11. A block 14 indicating that "No Postage Necessary If Mailed In The United States" is positioned in the upper right hand corner of mail piece 11, and a statement 15 that indicates "Postage Will Be Paid By Addressee" is positioned above recipient address field 12. Mail piece 11 also contains a block 16 positioned above statement 15. Block 16 indicates the type of mail, i.e., business reply mail 17, the type of service, i.e., first class mail 18, the permit number 19 and the location 20 of the post office that issued permit number 19. A facing identification mark 21 is positioned along the top edge of mail piece 11, and horizontal bars 22 are positioned along the right edge of mail piece 11. A postnet bar code 23 is positioned below recipient address field 12 in a bar code clear zone.

Figure 2:
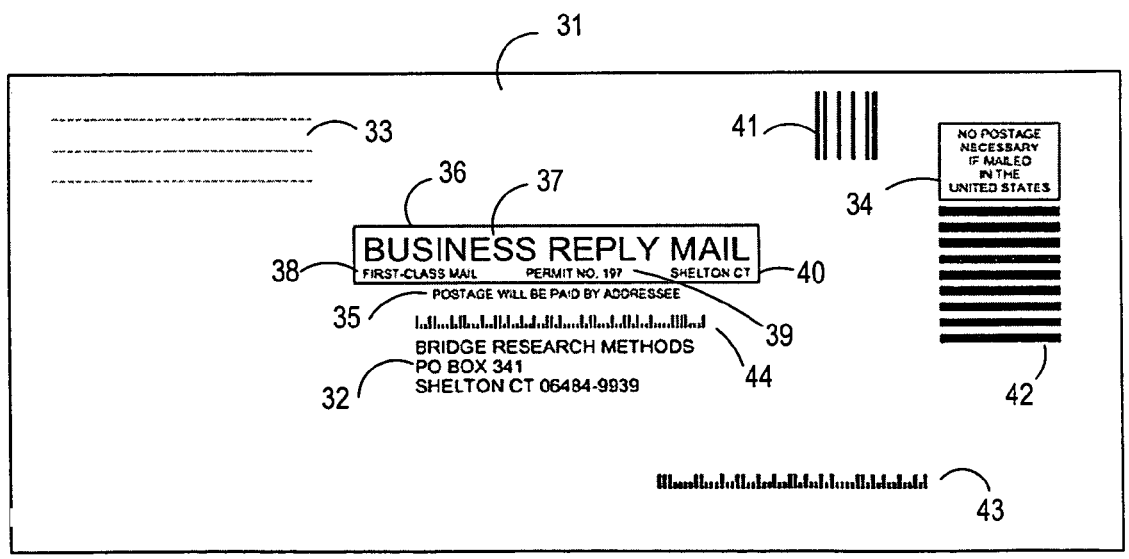
FIG. 2 is a drawing of a business reply mail piece that may be utilized by this invention.

FIG. 2 is a drawing of a business reply mail piece 31 that may be utilized by this invention. Mail piece 31 has a recipient address field 32, and a sender address field 33 that is completed by the person returning business reply mail piece 31. A block 34 indicating that "No Postage Necessary If Mailed In The United States" is positioned in the upper right hand corner of mail piece 31, and a statement 35 that indicates "Postage Will Be Paid By Addressee" is positioned above recipient address field 32. Mail piece 31 also contains a block 36 positioned above statement 35. Block 36 indicates the type of mail, i.e., business reply mail 37; the type of service, i.e., first class mail 38; the permit number 39; and, the location 40 of the post office that issued permit number 39. A facing identification mark 41 is positioned along the top edge of mail piece 31, and horizontal bars 42 are positioned along the right edge of mail piece 11. A postnet bar code 43 is positioned below recipient address field 32. A planet code 44 is positioned between recipient address field 32 and statement 35. It would be obvious to one skilled in the art that planet code 44 may be positioned on a different area of mail piece 31.

Figure 3:
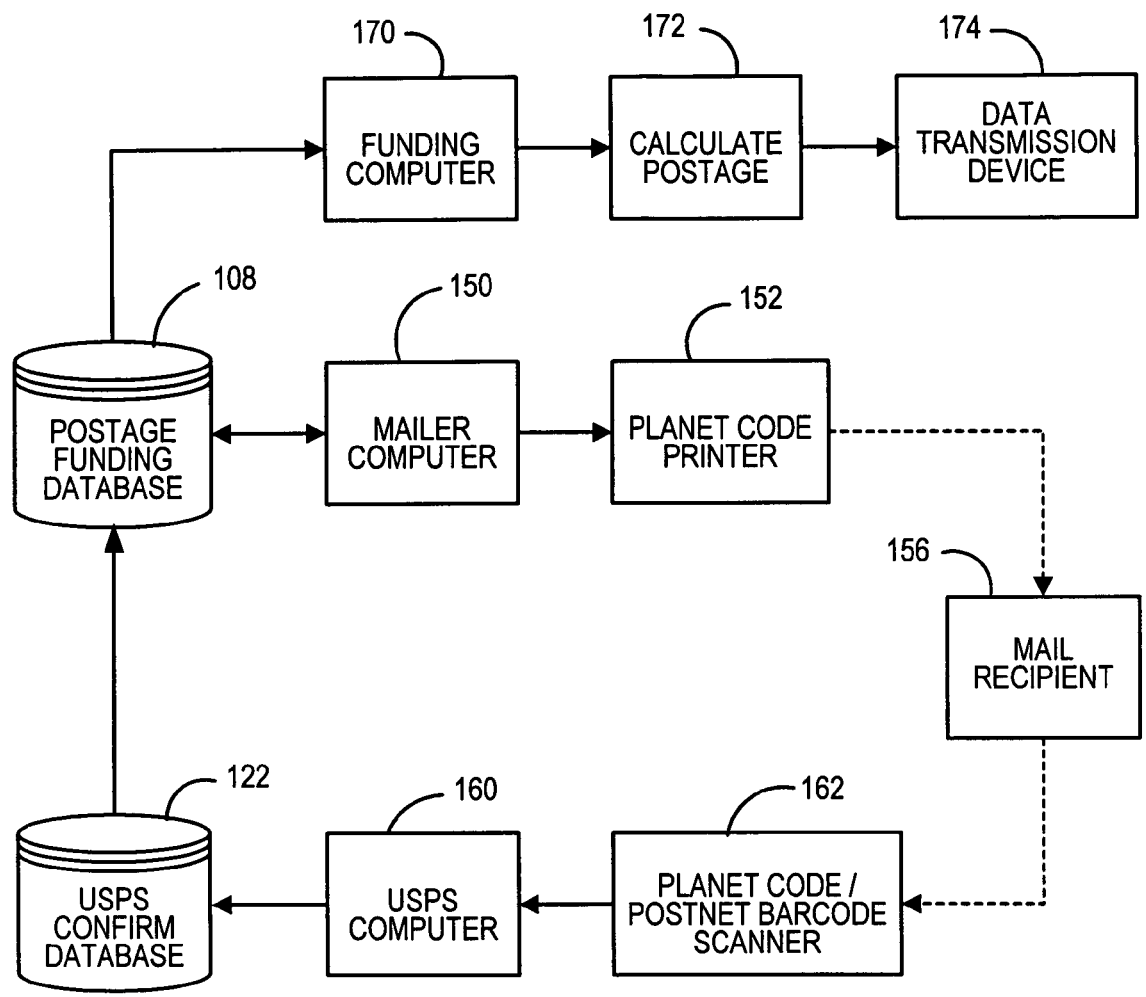
FIG. 3 is a block diagram of the process flow of the funding mechanism for business reply.

FIG. 3 is a block diagram of the process flow of the funding mechanism for business reply. A business mailer would enter his/her permit number, permit location, amounts of business reply mail piece postage and fees, planet codes, and confidence level in mailer computer 150. The foregoing entered information will be stored in database 108. Printer/inserter 152 will print the planet and postnet bar codes on mail piece 31 and insert them into an outer envelope for delivery to recipient customer 156 by the USPS.

When the recipient customer 156 opens the outer envelope and decides to return mail piece 31 to the business mailer via the USPS, a planet/ postnet bar code scanner 162 will read postnet bar code 43 and planet code 44 at many different locations during the postal delivery process. The information contained in bar codes 43 and 44 will be transferred to computer 160. Computer 160 will store information in USPS confirm database 122. Funding computer 170 will periodically obtain the information accumulated in database 122 and have the information copied in database 108 before mail piece 31 is delivered to the business mailer. Then funding computer 170 will periodically calculate the postage 172 that will be due to the USPS for particular business mailers before mail piece 31 is delivered to the business mailer. The calculated postage will be sent to data transmission device 174. Device 174 will alert the business mailer that a specified number of mail pieces 31 have been scanned by the USPS at this time, and the business mailer will owe the USPS a specified amount of money on a given future day. The business mailer may elect to pay the USPS the specified amount of money on the given future day or have an automatic clearinghouse transaction be used to pay the specified amount money on the given future day to the USPS.

Figure 4:
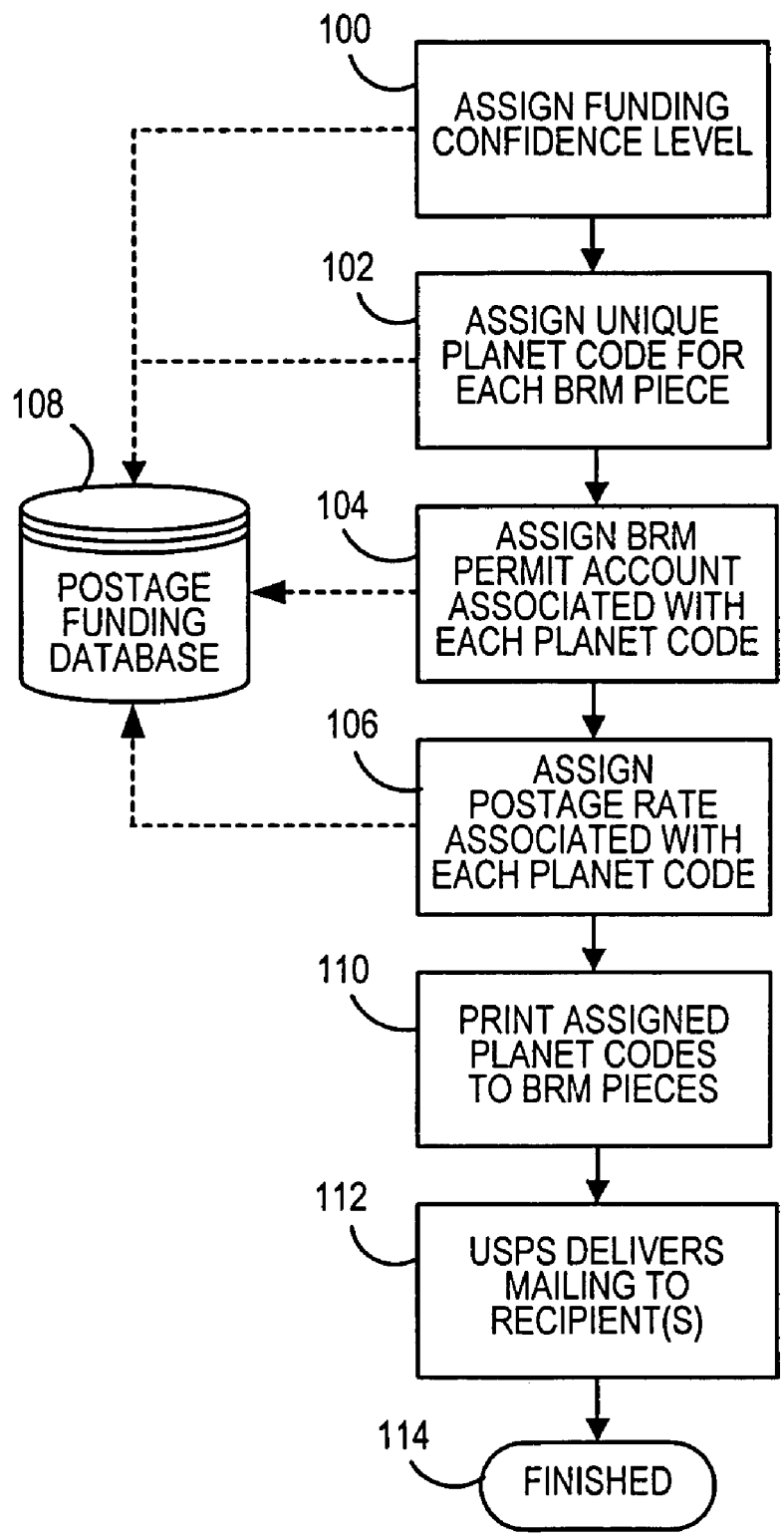
FIG. 4 is s a flow chart showing the processing of the preparation of mail piece 31 of FIG. 2.

FIG. 4 is a flow chart showing the processing of the preparation of mail piece 31 of FIG. 2. The program begins in block 100 where funding confidence levels are assigned, i.e., by the mailer who selects a level of confidence that he/she has funded enough money to pay for the returned business reply. The confidence level selected may be 95%. In block 102 the program assigns a unique planet code for each business reply mail piece 31 that is produced. Then the program goes to block 104 to assign for each produced mail piece 31 a permit account that is associated with each planet code. Now the program goes to block 106 where the program assigns postage rates that are associated with each planet code that is produced on a mail piece 31. Postage funding database 108 receives data from blocks 100, 102, 104 and 106. Data base 108 stores the business reply mail piece 31 permit numbers; the location of the USPS Offices that issued the permit numbers; the postage rate for each produced mail piece 31; and the planet code assigned for each mail piece 31.

Then in block 105, the assigned planet codes are printed on each mail piece 31. At this point in block 110, mail pieces 31 are inserted into other envelopes (not shown) that are delivered to the USPS, which subsequently delivers the outgoing envelopes containing mail pieces 31 to recipients. Then, in block 114, the preparation of mail pieces 31 is complete.

Figure 5:
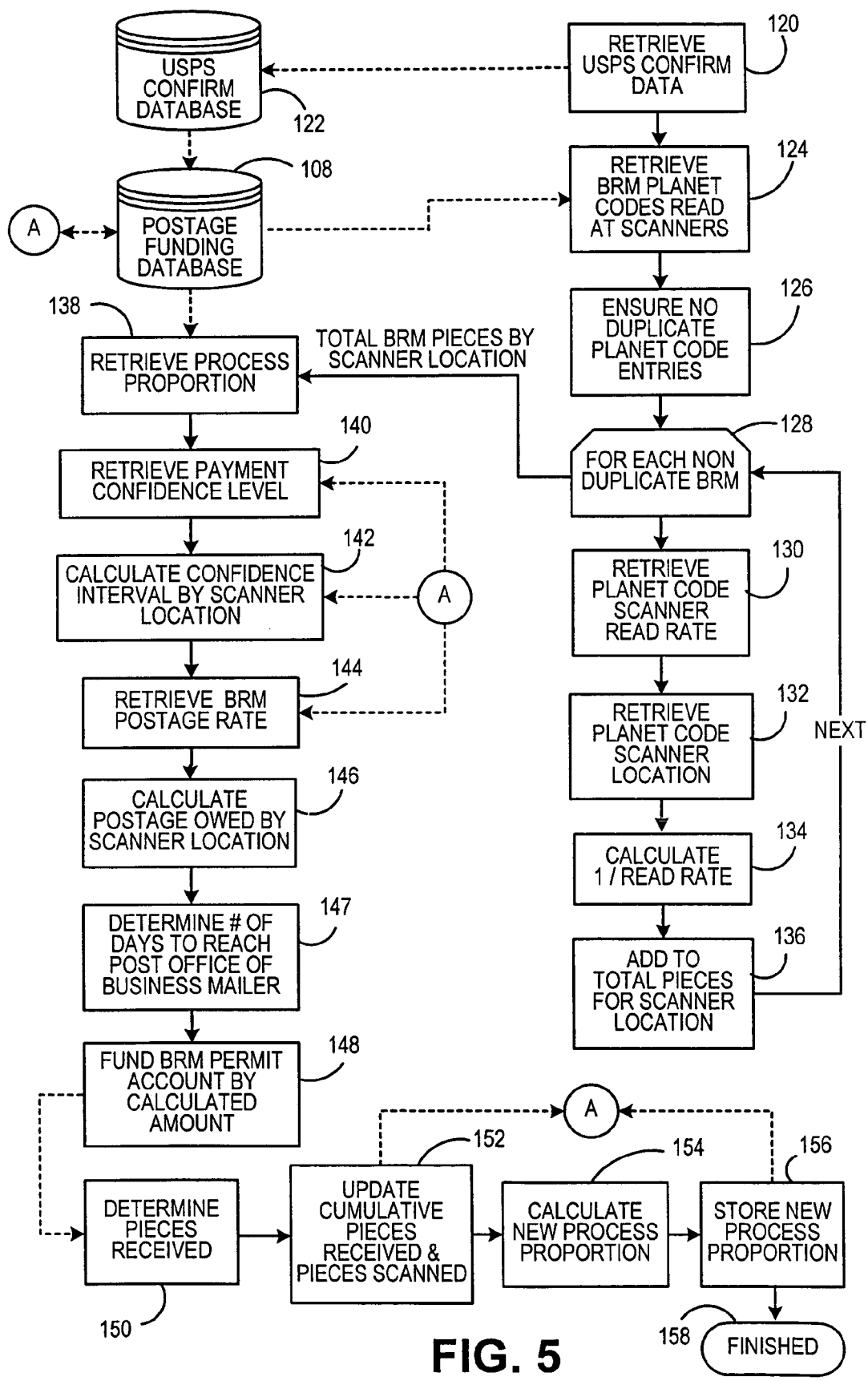
FIG. 5 is a flow chart that shows the process to calculate the postage owed by the business mailer.

FIG. 5 is a flow chart that shows the process to calculate the postage owed by the business mailer. Block 120 retrieves USPS confirm data from USPS confirm database 122. Then the information in database 122 is copied into postage funding database 108. Now block 124 retrieves the planet code data and other data read by scanners 162 (FIG. 3). Block 126 insures that there will be only one planet code entry for each mail piece 31 that is read by scanners 162 which are positioned at different locations along the USPS delivery route.

Block 128 causes blocks 130, 132, 134 and 136 to be performed for each mail piece 31. Now in block 130, the planet code scanner read rate that scanned mail piece 31 is retrieved from postage funding database 108. Block 130 implies an average postal scanner read rate that was determined by previous experience with this system. For instance, if 95 mail pieces were read by scanners 162, and 100 mail pieces 31 were delivered to the business mailer, the read rate would be 95%. Then in block 132, the planet code scanner location is obtained from postage funding database 108. At this point block 134 calculates one divided by the planet code scanner read rate. For instance, if the read rate was 50%, 1 divided by 50% would equal 2. Thus, if 50 mail pieces 31 were reported scanned by scanners 162, probably 100 mail pieces 31 were passed by or not processed by scanners 162.

Then block 136 adds the total mail pieces calculated in block 134 to the sum of previously calculated mail pieces 31 at a specific scanner location until all the mail pieces 31 for a given period of time are processed.

After all the mail pieces 31 are processed for a given day, block 138 retrieves the process proportion of the number of mail pieces 31 scanned by location divided by the number of mail pieces 31 that actually passed by that scanner location from database 108. Then in block 140, the payment confidence level is retrieved from database 108.

Then in block 142 the confidence interval is calculated using the following equation:

Upper Confidence Interval=$p+Z$*Square Root(($p(1-p))/n$)

Lower Confidence Interval=$p-Z$*Square Root(($p(1-p))/n$)

Where: Square Root $((p(1-p))/n)$=Standard Deviation

Where:
P=Process Proportion
n=Scanned Pieces
Z=Standardized Normalized Variable (i.e. one standard deviation=1, two standard deviation=2, . . . , etc.)

Then in block 144 the business reply mail per piece postage rate is retrieved from database 108. Now in block 146, the postage is calculated by scanner location using the following equation.

Postage by Scanner Location=*BRM* per Piece Postage Rate*(Total *BRM* pieces by Scanner Location/Lower Confidence Interval)

Now block 147 determines the estimated number of days it will take for mail piece 31 to go from the location of scanner 162 currently scanning mail piece 31 to the post office of the business mailer. For example, the USPS divides the United States into postal zones, and it takes approximately 1–5 days for first class mail to go from one entry zone in the United States to another delivery zone. Then in block 148, the business mailer's permit account is funded by the calculated amount on the necessary day.

If 10,000 mail pieces 31 are expected to be delivered to the business mailer one day from now, the business mailer would owe the USPS (10,000) ($.097) or $9,700.00 one day from now, and this invention would fund the business mailer's account one day from now. If 20,000 mail pieces 31 are expected to be delivered to the business mailer two days from now, the business mailer would owe the USPS (20,000) ($.097) or $19,400.00 two days from now, and this invention would fund the business mailer's account two days from now. If 15,000 mail pieces 31 are expected to be delivered to the business mailer three days from now, the business mailer would owe the USPS (15,000) ($.097) or $14,550.00 three days from now, and this invention would fund the business mailer's account three days from now. If 450 mail pieces 31 are expected to be delivered to the business mailer four days from now, the business mailer would owe the USPS (450) ($.097) or $4,356.00 four days from now, and this invention would fund the business mailer's account four days from now. If 45,300 mail pieces 31 are expected to be delivered to the business mailer five days from now, the business mailer would owe the USPS (45,300) ($.097) or $43,941.00 five days from now, and this invention would fund the business mailer's account five days from now.

At this point, block 150 determines the number of mail pieces received. Then block 152 updates the cumulative mail pieces received, and mail pieces scanned postage funding database 108 is also updated by block 152. Now block 154 calculates the new process proportion which equals the cumulative mail pieces scanned divided by the cumulative mail pieces received by the business mailer. Then, block 156 stores the new process proportion calculated in block 154 in block 108 to be used the next time. Then in block 158, the above process is repeated after a specified period of time.

The above specification describes a new and improved method for automatically funding business reply mail. It is realized that the above description may indicate to those skilled in the art additional ways in which the principles of this invention may be used without departing from the spirit. Therefore, it is intended that this invention be limited only by the scope of the appended claims.

What is claimed is:

1. A method for enabling a mailer to infer a number of business reply mail pieces that the mailer is going to receive on a given day and determine an amount of postage and fees that are due, the method comprising steps of:
   (a) placing a code that references a mailer's permit number and the postage associated with the business reply mail pieces, on the business reply mail pieces;
   (b) scanning the code on the business reply mail pieces;
   (c) determining the amount of postage and fees due for the scanned business reply mail pieces;
   (d) estimating a date on which the business mailer would receive the scanned mail piece;
   (e) funding an account at a carrier for the amount of business reply mail that the mailer is expected to receive on the estimated date so that the mailer will have on a daily basis sufficient funds in the account to cover the postage and fees due for the receipt of the expected business reply mail pieces; and
   (f) mapping the method to calculate a confidence level using scanning location to determine an amount of funding that is required.

2. The method claimed in claim 1, wherein the scanning step further comprises the step of:
   determining a read rate to more accurately determine the number of business reply mail pieces being processed.

3. The method claims in claim 1 wherein the mapping step further comprises the step of:
   determining a mean and standard deviation to calculate a new confidence level to determine the amount of funding that is required. pieces being processed.

4. The method claimed in claim 1, further including the step of:
   determining the number of mail pieces actually received by the mailer to calculate a process s proportion.

5. The method claimed in claim 4, further including the step of:
   using the process proportion to calculate a next confidence interval.

6. The method claimed in claim 4, wherein the process proportion is determined by:
   dividing the number of business reply mail pieces scanned by the number of business reply mail pieces received.

7. The method claimed in claim 1, wherein the code is a planet code.

8. The method claimed in claim 1, wherein the carrier is the United States Postal Service.

* * * * *